(12) United States Patent
Hurst et al.

(10) Patent No.: US 9,500,553 B2
(45) Date of Patent: Nov. 22, 2016

(54) SYSTEMS AND METHODS FOR IMPROVED DYNAMIC PRESSURE MEASUREMENTS

(71) Applicant: Kulite Semiconductor Products, Inc., Leonia, NJ (US)

(72) Inventors: Adam Hurst, Slate Hill, NJ (US); Joseph R. VanDeWeert, Maywood, NJ (US); Scott Goodman, Wayne, NJ (US); Boaz Kochman, New York, NY (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 425 days.

(21) Appl. No.: 13/828,037

(22) Filed: Mar. 14, 2013

(65) Prior Publication Data

US 2014/0260519 A1   Sep. 18, 2014
US 2016/0209289 A9   Jul. 21, 2016

Related U.S. Application Data

(63) Continuation-in-part of application No. 13/312,381, filed on Dec. 6, 2011, now Pat. No. 8,613,224, which is a continuation of application No. 12/614,741, filed on Nov. 9, 2009, now Pat. No. 8,074,521.

(51) Int. Cl.
*G01L 13/02* (2006.01)
*G01L 27/00* (2006.01)

(52) U.S. Cl.
CPC ............. *G01L 27/005* (2013.01); *G01L 13/02* (2013.01); *G01L 27/002* (2013.01)

(58) Field of Classification Search
CPC .................... G01L 27/005; G01L 27/002
USPC ........................................... 73/716
See application file for complete search history.

(56) References Cited

U.S. PATENT DOCUMENTS

| | | | | |
|---|---|---|---|---|
| 4,060,716 | A * | 11/1977 | Pekrul et al. | 702/184 |
| 5,509,312 | A * | 4/1996 | Donzier et al. | 73/706 |
| 8,561,470 | B2 * | 10/2013 | Kurtz et al. | 73/721 |
| 2004/0037693 | A1 * | 2/2004 | Stabley et al. | 415/1 |
| 2005/0235754 | A1 * | 10/2005 | Kurtz et al. | 73/715 |

(Continued)

*Primary Examiner* — John Fitzgerald
*Assistant Examiner* — Alexander Mercado
(74) *Attorney, Agent, or Firm* — Troutman Sanders LLP; James E. Schutz; Mark Lehi Jones

(57) ABSTRACT

A method, device, or system is provided for improving dynamic pressure measurements. In one embodiment, a method comprises receiving, at a filter structure having a restricting tube, an input pressure having a static pressure ($P_S$), a lower-frequency dynamic pressure ($P_{LD}$) and a higher-frequency dynamic pressure ($P_{HD}$); filtering, by the restricting tube, the input pressure to substantially pass an output pressure having the static pressure ($P_S$), the lower-frequency dynamic pressure ($P_{LD}$), and an attenuated higher-frequency dynamic pressure ($P_{HD}$); and outputting, from the filter structure, the output pressure.

20 Claims, 6 Drawing Sheets

(56) References Cited

U.S. PATENT DOCUMENTS

| | | | |
|---|---|---|---|
| 2005/0278108 A1* | 12/2005 | Norman et al. | 701/100 |
| 2006/0090471 A1* | 5/2006 | Shah et al. | 60/772 |
| 2006/0137456 A1* | 6/2006 | Dasgupta et al. | 73/705 |
| 2008/0232950 A1* | 9/2008 | Stabley et al. | 415/1 |
| 2010/0011846 A1* | 1/2010 | Krok et al. | 73/112.06 |
| 2011/0093182 A1* | 4/2011 | Weber et al. | 701/102 |
| 2011/0107840 A1* | 5/2011 | Kurtz et al. | 73/714 |

* cited by examiner

SYSTEMS AND METHODS FOR IMPROVED DYNAMIC PRESSURE MEASUREMENTS

CROSS REFERENCE TO RELATED APPLICATIONS

This application is a Continuation-in-Part of U.S. Non-Provisional Application No. 13/312,381 filed on 6 Dec. 2011 and issued as U.S. Pat. No. 8,613,224 on 24 Dec. 2013, which is a Continuation of U.S. Non-Provisional Application No. 12/614,741 filed 9 Nov. 2009 and issued as U.S. Pat. No. 8,074,521 on 13 Dec. 2011.

TECHNICAL FIELD

This disclosure generally relates to pressure measurements and more particularly to systems and methods for improved dynamic pressure measurements.

BACKGROUND

In many environments and applications, it is often desirable to measure static pressure, dynamic pressure or both. In some instances, the static pressure may be much higher than the dynamic pressure. For example, the static pressure may be, for instance, an order of magnitude greater than the dynamic pressure. Further, the dynamic pressure may be associated with one or more distinct frequencies, which may occur at a relatively high frequency. For instance, aerodynamic engineers have long desired to measure high frequency flow and pressure in gas turbine engines and over aircraft wings. This capability is made possible using pressure transducers such as those fabricated from micro-machined silicon. Further, this capability may be associated with frequencies in the tens of kilohertz (kHz). As such, Kulite Semiconductor Products, Inc., the assignee herein, has developed many transducers which operate to measure such pressure disturbances in gas turbine engines and over aircraft wings. Such devices are the subject matter of various patents that describe their operation and fabrication such as U.S. Pat. No. 6,612,178, entitled "Leadless Metal Media Protected Pressure Sensor" issued on Sep. 2, 2003 to Dr. Anthony Kurtz et al. and assigned to the assignee herein and U.S. Pat. No. 6,363,792, entitled "Ultra High Temperature Transducer Structure" issued on Apr. 2, 2002 to Dr. Anthony Kurtz et al. and assigned to the assignee herein.

Using a gas turbine as an example, in order to determine its pressure and higher-frequency flow, a pipe is attached to a combustion chamber of the gas turbine to allow hot gases within the chamber to cool before reaching a sensor. While the pipe successfully cools the gases, it also reduces the bandwidth of the pressure measurement by the sensor due to the harmonic frequencies of the tube. Similar to blowing air over the top of an open bottle, the air inside the pipe will be compressed by the air flow outside the pipe. In essence, the air inside the bottle acts as a spring. The oscillations of the air inside the pipe results in resonant frequencies similar to that of an organ pipe. These oscillations make measuring the pressure and flow of the gases within the combustion chamber of the gas turbine difficult. A long, curled tube, which may be referred to as an infinite tube, may be used to remove these resonance frequencies. However, this tube may require a long length and precise coiling. Further, other limitations may exist such as limited access for mounting sensors in a turbine case, discriminating against low and high frequencies, and other issues. Accordingly, there is a need for techniques to overcome these limitations to improve dynamic pressure measurements. Furthermore, other desirable features and characteristics of the present disclosure will become apparent from the subsequent detailed description and claims, taken in conjunction with the accompanying figures and the foregoing technical field and background.

SUMMARY OF THE DISCLOSURE

The subject technology relates to methods, devices, and systems for improving dynamic pressure measurements. In one embodiment, at a filter structure, the filter structure may receive an input pressure. The input pressure may include a static pressure ($P_S$), a lower-frequency dynamic pressure ($P_{LD}$), and a higher-frequency dynamic pressure ($P_{HD}$). The filter structure may include a restricting tube. The filter structure may filter, by the restricting tube, the input pressure to substantially pass an output pressure having the static pressure ($P_S$), the lower-frequency dynamic pressure ($P_{LD}$), and an attenuated higher-frequency dynamic pressure ($P_{HD}$). Finally, the filter structure may output, at the filter structure, the output pressure.

BRIEF DESCRIPTION OF THE FIGURES

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION

Figure 1:
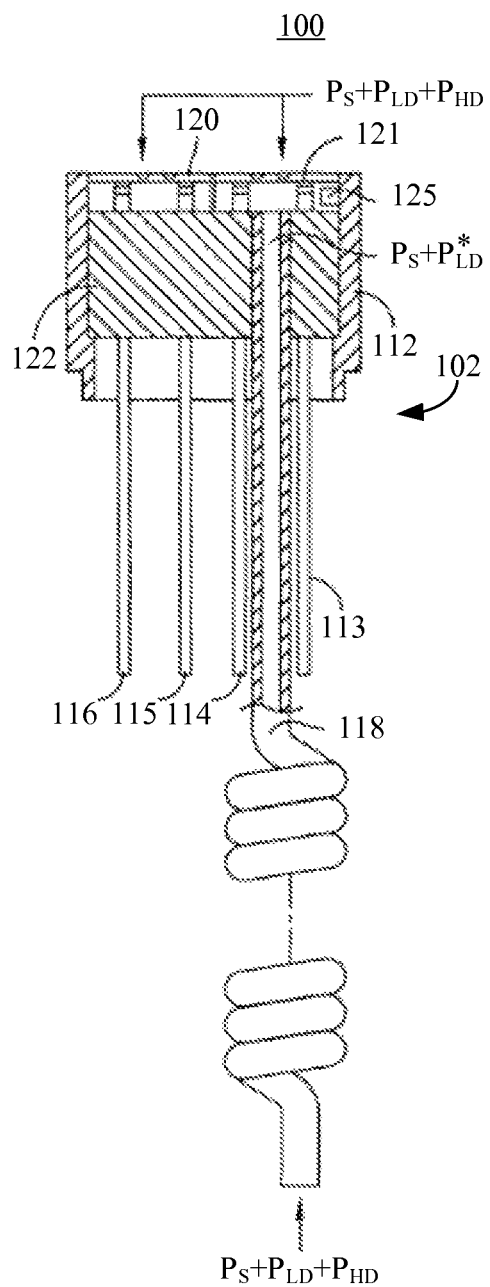
FIG. 1 illustrates one embodiment of a portion of a system for improved dynamic pressure measurements in accordance with various aspects set forth herein.

The following detailed description is merely illustrative in nature and is not intended to limit the present disclosure, or the application and uses of the present disclosure. Furthermore, there is no intention to be bound by any expressed or implied theory presented in the preceding field of use, background, or summary of the disclosure or the following detailed description. The present disclosure provides various examples, embodiments and the like, which may be described herein in terms of functional or logical block elements. Various techniques described herein may be used for improved dynamic pressure measurements. The various aspects described herein are presented as methods, devices (or apparatus), and systems that may include a number of components, elements, members, modules, nodes, peripherals, or the like. Further, these methods, devices, and systems may include or not include additional components, elements, members, modules, nodes, peripherals, or the like.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. Relational terms such as "first" and "second," and the like may be used solely to distinguish one entity or action from another entity or action without necessarily requiring or implying any actual such relationship or order between such entities or actions. The term "or" is intended to mean an inclusive "or." Further, the terms "a," "an," and "the" are intended to mean one or more unless specified otherwise or clear from the context to be directed to a singular form. The term "include" and its various forms are intended to mean including but not limited to.

In the following description, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

This disclosure provides example methods, devices, and systems for improved dynamic pressure measurements. For instance, by configuring a filter structure in accordance with various aspects described herein, an improved dynamic pressure measurement capability by a sensor structure is provided. In one embodiment, the filter structure may be configured to attenuate higher frequency pressure. In another example, the filter structure may be a low-pass mechanical micro-filter. The filter structure may be operatively coupled to a sensor structure, wherein the sensor structure may include a differential pressure transducer. In one example, the sensor structure may be configured to achieve static pressure equalization, substantially cancelling the static pressure component of the measurement from the sensor structure. The filter structure may filter input pressure, which may include a lower frequency pressure and a higher frequency pressure, to attenuate the higher frequency pressure, resulting in the lower frequency pressure being input to the sensor structure such as to one side of a differential pressure transducer's diaphragm. Further, the input pressure may be input to the sensor structure such as to the other side of the differential pressure transducer's diaphragm, resulting in the sensor providing an accurate measurement of the higher frequency pressure. It is important to recognize that the lower frequency pressure may be substantially cancelled by the sensor structure, resulting in a measurement of the higher frequency pressure. The higher-frequency pressure may include dynamic (substantially time varying) components. Further, the lower-frequency pressure may include static and dynamic components. For example, the input pressure may include a static pressure ($P_S$), and a higher-frequency dynamic pressure ($P_{HD}$). In another example, the input pressure may include a static pressure ($P_S$), a lower-frequency dynamic pressure ($P_{LD}$) and a higher-frequency dynamic pressure ($P_{HD}$).

FIG. 1 illustrates one embodiment of a portion of a system 100 for improved dynamic pressure measurements in accordance with various aspects set forth herein. The system 100 may be configured to include a reference tube 118 operatively coupled to a sensor structure 102. The reference tube 118 may also be referred to as a differential tube. The reference tube 118 may be configured as a low-pass filter. The sensor structure 102 may be configured to include transducers 120 and 121 arranged in a housing 112. The transducer 120 may have a thicker diaphragm than the transducer 121. The transducer 120 may be configured to produce at output ports 115 and 116 associated therewith, and disposed through header 122, a voltage proportional to a static pressure ($P_S$). The transducer 121 may be operatively coupled to the tube 118 to produce at output ports 113 and 114 a voltage proportional to a dynamic pressure ($P_D$). The sensor structure 102 may be configured to include a stop member 125. The stop member 125 may be used to mitigate the ability of the transducer 121 to deflect in a downward direction for dynamic pressure ($P_D$) of higher magnitude such as those pressure greater than the magnitude of the desired dynamic pressure ($P_D$).

In FIG. 1, each transducer 120 and 121 may receive, at the top of the sensor structure 102, an input pressure such as a static pressure ($P_S$) and a dynamic pressure ($P_D$). The static pressure ($P_S$) may include a lower-frequency dynamic pressure ($P_{LD}$). Further, the dynamic pressure ($P_S$) may include a higher-frequency dynamic pressure ($P_{HD}$). Further, the transducer 120 may receive, at the backend of the sensor structure 102, the same input pressure as presented at the front of the filter structure 102. The reference tube 118 may be configured as a filter to improve, for instance, the signal-to-noise ratio (SNR) of measurements from the sensor structure 102. The frequency response of the reference tube 118 may be tuned for static pressure ($P_S$) compensation to improve, for instance, the SNR of measurements of the higher-frequency dynamic pressure ($P_{HD}$) from the sensor structure 102. In some circumstances, the reference tube 118 may also pass the lower-frequency dynamic pressure ($P_{LD}$) to the transducer 121, which may result in the lower-frequency dynamic pressure ($P_{LD}$) substantially canceling or becoming distorted as they are presented to the sensor structure 102 such as on the frontend and backend of the transducers 120 and 121. The cancelled or distorted lower-frequency dynamic pressure ($P_{LD}$) may decrease the quality of the measurements from the sensor, as discussed in T. J. Mueller, *Aeoracoustic measurements*, Berlin; N.Y.: Springer; 2002.

Figure 2:
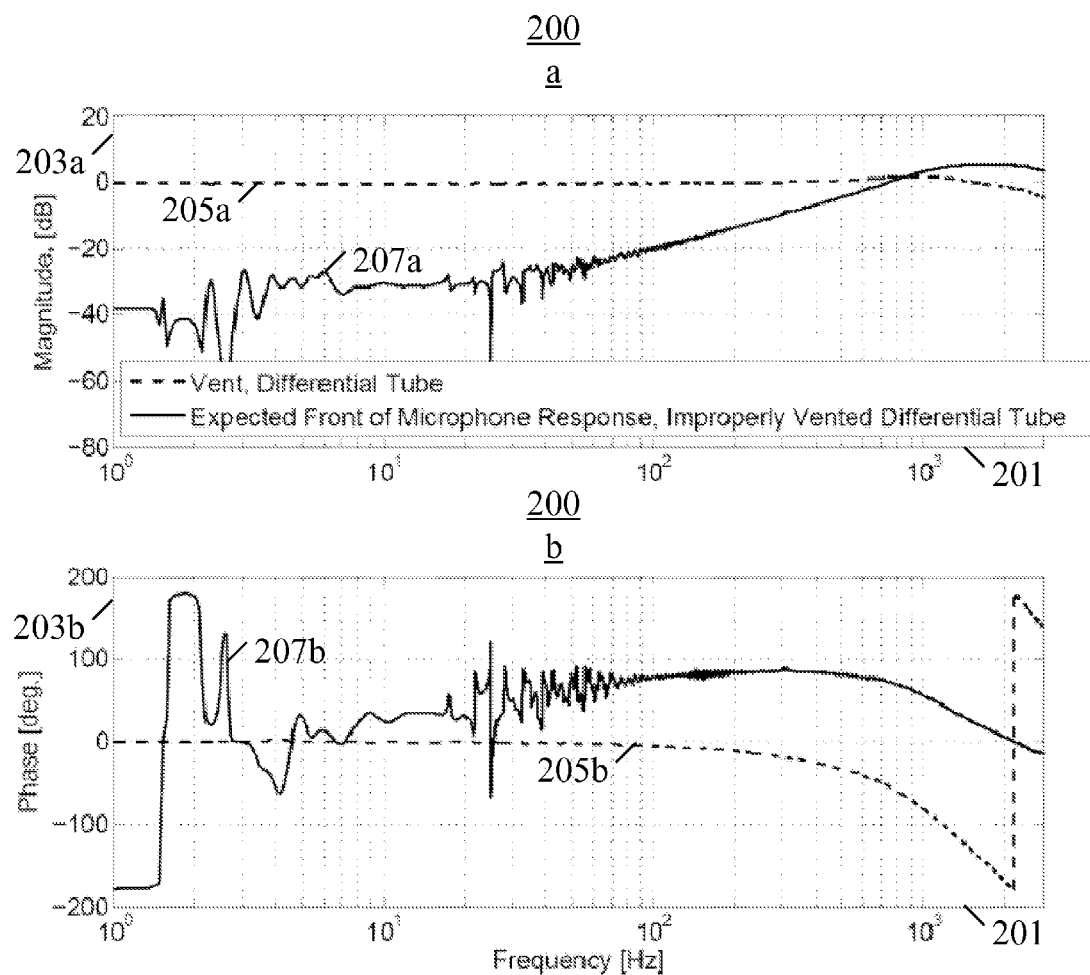
FIG. 2 illustrates a transfer function of one embodiment of the system of FIG. 1.

FIG. 2 illustrates a transform function of one embodiment of the system 100 of FIG. 1. The transform function is characterized by a frequency response 200a and a phase response 200b. For each response 200a and 200b, the frequency from one Hertz (1 Hz) to three thousand Hertz (3 kHz) is plotted on the abscissa 201. For the frequency response 200a, the logarithmic magnitude from negative eighty decibels (−80 dB) to twenty decibels (20 dB) is plotted on the ordinate 203a. For the phase response 200b, the phase from negative two hundred degrees (−200°) to two hundred degrees (200°) is plotted on the ordinate 203b. For the frequency response 200a, a graph 205a shows the expected frequency response at the frontend of the sensor structure 102 with improper venting via the reference tube 118. Further, a graph 207a represents an experimentally determined frequency response as measured at the backend of the reference tube 118 at the transducer 121. For these measurements, the Kulite® MIC-190™ transducer was used. Similarly, for the phase response 200b, a graph 205b shows the expected phase response at the frontend of the sensor structure 102 with improper venting via the reference tube 118. Further, a graph 207b represents an experimentally determined phase response as measured at the frontend of the reference tube 118 at the transducer 121. The results show that the reference tube 118 used for static pressure equalization transfers the lower-frequency dynamic pressure ($P_{LD}$) to the backend of the transducer 121, effectively causing the lower-frequency dynamic pressure ($P_{LD}$) to cancel. Further, the results show a resonance frequency of about nine hundred-thirty Hertz (930 Hz). This resonance frequency, which is dependent on the length of the reference tube 118, may cause undesirable measurement distortion or attenuation at frequencies near the resonance frequency. Further, the graph 205a shows that if the frontend of the sensor structure 100 and the reference tube 118 are simultaneously exposed to pressure, the reference tube 118 may not possess sufficient dampening to prevent signal cancellation or to prevent signal distortion from one or more resonance frequencies of the reference tube 118. Such condition may reduce the measurement accuracy of lower-frequency pressure.

In a different embodiment, the effective length of the reference tube 118 may be increased to create a "semi-infinite" tube by, for instance, increasing the length of the reference tube 118 or adding another tube to the reference tube 118. In one example, the effective length of the reference tube 118 may be on the order of tens of feet. In another example, the effective length of the reference tube 118 may be ten (10) feet. The increased effective length of the reference tube 118 may further dampen the lower-frequency dynamic pressure ($P_{LD}$) or the higher-frequency dynamic pressure ($P_{HD}$) as they traverse the "semi-infinite" tube such as via viscous dissipation or heat transfer, as discussed in T. J. Mueller, *Aeroacoustic measurements*, Berlin; N.Y.: Springer; 2002. However, increasing the effective length of the reference tube 118 may be inefficient due to cost, size, weight, quality, or any combination thereof.

Figure 3:
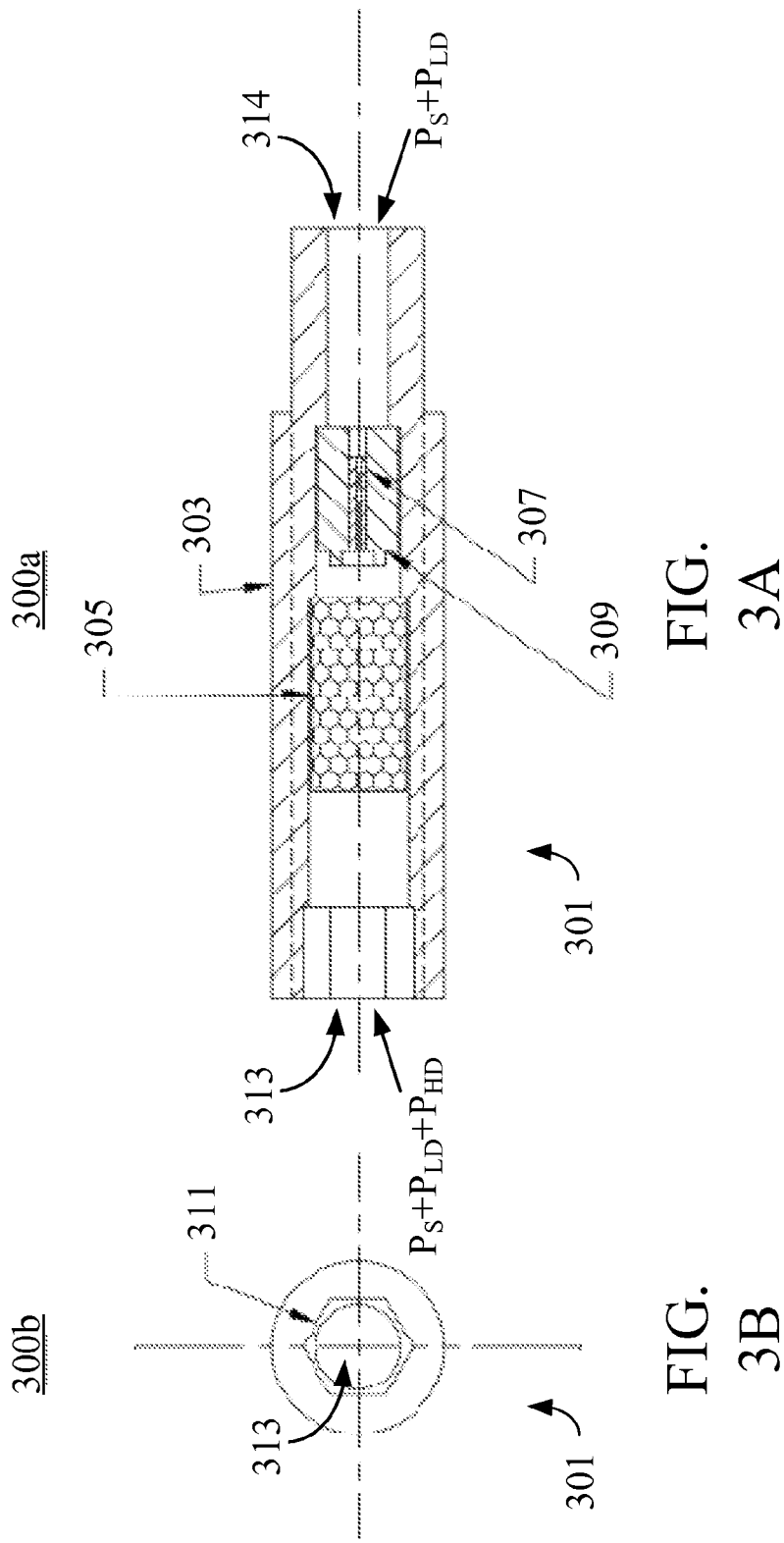
FIGS. 3A and 3B illustrate a partial longitudinal cross-sectional view and a front view, respectively, of one embodiment of a filter structure in accordance with various aspects set forth herein.

As an alternative to increasing the effective length of a reference tube, FIGS. 3A and 3B illustrate a partial longitudinal cross-sectional view 300a and a front view 300b, respectively, of one embodiment of a filter structure 301 in accordance with various aspects set forth herein. The filter structure 301 may be configured as a low-pass mechanical micro-filter. The filter structure 301 may be configured to include a housing 303, a porous filter 305, a restricting tube 307, a restricting tube holder 309, a cap 311, an input port 312 and an output port 313. The housing 303 may have an elongated chamber. The porous filter 305, the restricting tube 307, and the restricting tube holder 309 may be assembled into the elongated chamber of the housing 303. In various examples, the housing 303 may be threaded to allow the attachment of the cap 311 for removal or replacement of the components within the elongated chamber of the housing 303.

In FIGS. 3A and 3B, the cap 311 may be disposed within the chamber at a frontend of the housing 303 and may include an inlet port 313 to allow the pressure to enter the filter structure 301. In one example, the inlet port 313 may include a screen to filter coarse particulate matter. The cap 311 may be, for instance, a threaded hexagonal screw, which may attach to a threaded housing 303. The porous filter 305 may be configured to provide initial filtering for the filter structure 301. In various examples, the porous filter 305 may provide additional damping or may be used to prevent debris from passing through the filter structure 301 such as particulate matter. The restricting tube holder 309 may be configured to include a restricting tube 307. The restricting tube holder 309 may be configured to include one restricting tube 307 or a plurality of restricting tubes 307 such as an array of restricting tubes 307. In one example, the restricting tube 307 may have a diameter in the range of about forty thousandth of an inch (40 mils) to about one thousandth of an inch (1 mil). In another example, the restricting tube 307 may have a length of about one-hundredth of inch (0.01 in.) to about two feet (2 ft.). In another example, the restricting tube 307 may have a length sufficient to provide the desired viscous dissipation. In another example, the restricting tube 307 may be straight. It is important to recognize that the filter structure 301 may be used for gaseous or liquid media.

In FIGS. 3A and 3B, in operation, for example, the filter structure 301 may receive at the inlet port 313, at a frontend of the filter structure 301, an input pressure such as a static pressure ($P_S$) and a dynamic pressure ($P_D$). The dynamic pressure ($P_D$) may include a lower-frequency dynamic pressure ($P_{LD}$) and a higher-frequency dynamic pressure ($P_{HD}$). The porous filter 305 may filter the input pressure to substantially remove, for instance, particulate matter. Further, the restricting tube 307 may low-pass filter the input pressure to substantially pass an output pressure having the static pressure ($P_S$), the lower-frequency dynamic pressure ($P_{LD}$), and an attenuated higher-frequency dynamic pressure ($P_{HD}$). The porous filter 305 may output at the outlet port 314, at a backend of the filter structure 301, the output pressure that is substantially indicative of the static pressure ($P_S$) and the lower-frequency dynamic pressure ($P_{LD}$)

In another embodiment, the filter structure 301 may be configured to include a single restricting tube. In one example, the restricting tube 307 may have a sufficiently small diameter. In another example, the restricting tube 307 may have a diameter of less than one thousandth of an inch (1 mil). In another example, the restricting tube 307 may have a diameter in the range of about forty thousandth of an inch (40 mils) to about one thousandth of an inch (1 mil). In another example, the restricting tube may have a length of less than about two (2) feet. In another example, the restricting tube may have a length in the range of about one-tenth of an inch to about two (2) feet to dampen out pressure waves oscillating at greater than one Hertz (1 Hz).

In another embodiment, a filter structure may be configured to include a plurality of restricting tubes. In one example, the plurality of restricting tubes may be configured as an array of restricting tubes. In another example, the plurality of restricting tubes may have a sufficiently small diameter. In another example, the plurality of restricting tubes may have a diameter of less than about one thousandth of an inch (1 mil). In another example, the plurality of restricting tubes may have a diameter in the range of about forty thousandth of an inch (40 mils) to about one thousandth of an inch (1 mil). In another example, the plurality of restricting tubes may have a combined length of less than about two (2) feet. In another example, each restricting tube of the plurality of restricting tubes may have a length in the range of about one-tenth of an inch to about two (2) feet to dampen out pressure waves oscillating at greater than one Hertz (1 Hz). In addition, the filter structure may operate on the principal that as the diameter of a restricting tube decreases, viscous effects with a gas media become more significant. Such a structure may be modeled as compressible, unsteady one-dimensional flow with viscous dissipation in a tube. The system of equations associated with this model may be reduced to a wave equation in one dimension with viscosity effects, as described in Equation 1 below.

$$\frac{1}{c^2}\left(\frac{\partial^2 p'}{\partial t^2} + \frac{\xi}{\rho} \cdot \frac{\partial p'}{\partial t}\right) = \frac{\partial^2 p'}{\partial x^2} \qquad (1)$$

The above partial differential equation with the appropriate boundary conditions may be solved using Laplace transforms such that the frequency response of the filter structure may be analytically estimated.

In another embodiment, a filter structure or portions thereof may be used in a high-temperature environment, such as a gas turbine.

In another embodiment, a filter structure may be adapted to a high-temperature transducer.

In another embodiment, a filter structure may be adapted to a liquid-cooled transducer.

Figure 4:
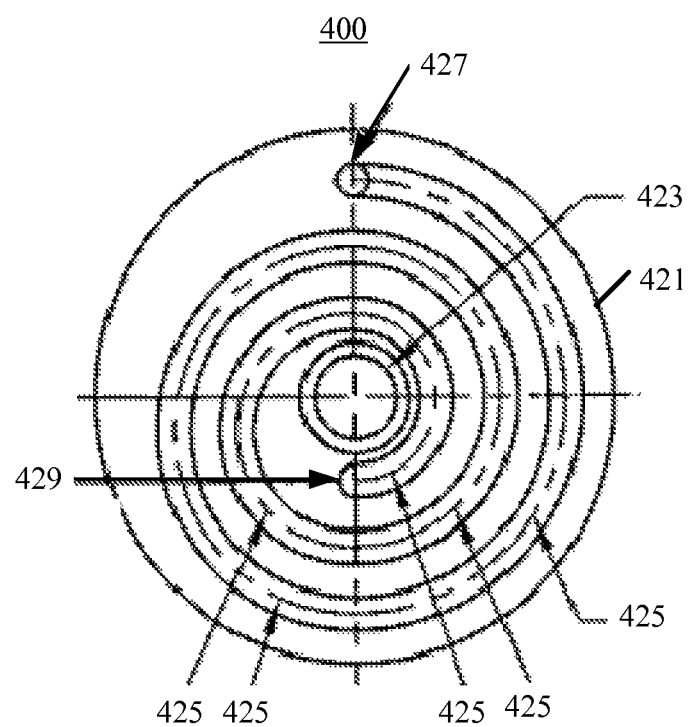
FIG. 4 illustrates a partial traverse cross-sectional view of one embodiment of a spiral filter structure with various aspects set forth herein.

FIG. 4 illustrates a partial traverse cross-sectional view of one embodiment of a spiral filter structure 400 with various aspects set forth herein. In FIG. 4, the spiral filter structure 400 may be configured to include a housing 421, a header 423, and a spiral tube 425. The housing 421 may have an elongated chamber. The spiral tube 425 may have a frontend 427 and a backend 429. The spiral tube 425 may be formed in a serpentine pattern to increase its effective length. Further, the spiral tube 425 may be configured as a low-pass filter. The frontend 427 of the spiral tube 425 may be operatively coupled to a backend of a filter structure such as to an outlet port or a restricting tube of the filter structure. Further, the backend 429 of the spiral tube 425 may be operatively coupled to a reference tube.

In another embodiment, all or a portion of the spiral filter structure 400 may be integrated into a filter structure.

Figures 5A, 5B:
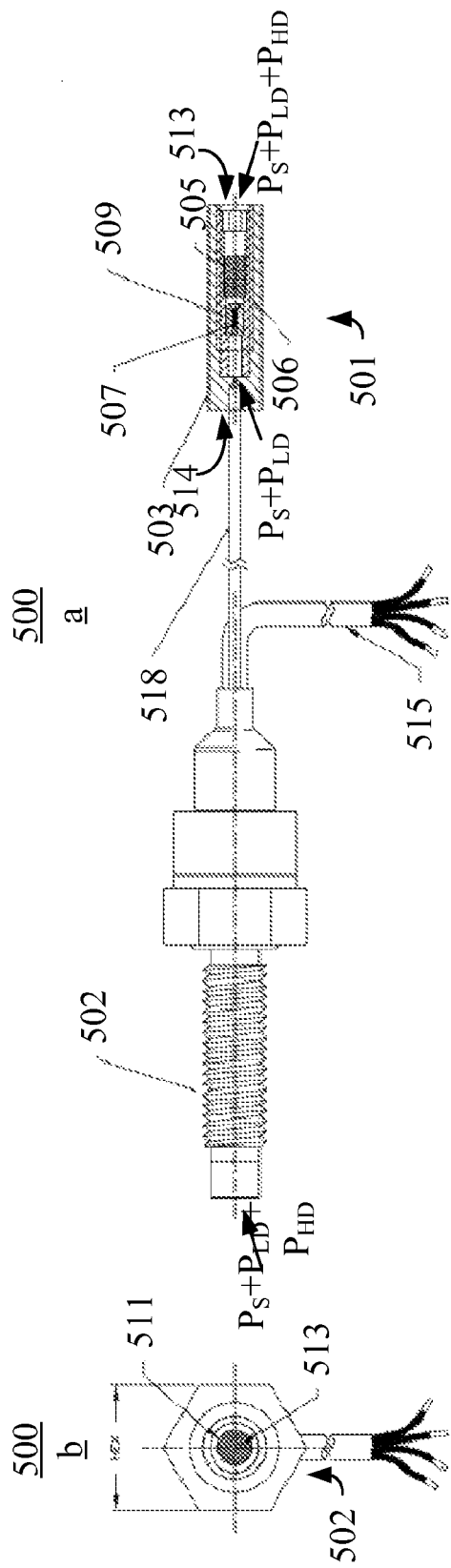
FIGS. 5A and 5B illustrates a partial longitudinal cross-sectional view and a front view, respectively, of another embodiment of a system for improved dynamic pressure measurements in accordance with various aspects set forth herein.

FIGS. 5A and 5B illustrates a partial longitudinal cross-sectional view 500a and a front view 500b, respectively, of another embodiment of a system 500 for improved dynamic pressure measurements in accordance with various aspects set forth herein. The system 500 may be configured to include a filter structure 501 operatively coupled to a sensor structure 502. The filter structure 501 may be configured to include a housing 503, a porous filter 505, a restricting tube 507, a restricting tube holder 509, a cap (not shown), an inlet port 513 and an outlet port 514. The housing 503 may have an elongated chamber. The porous filter 505, the filter housing 506 (which may be assembled separately and is replaceable if it becomes clogged), the restricting tube 507, and the restricting tube holder 509 may be assembled into the elongated chamber of the housing 503. In one example, the filter structure 501 may be a low-pass mechanical micro-filter. The filter structure 501 may be configured to improve the signal-to-noise ratio (SNR) of measurements from the sensor structure 502. In one example, the sensor structure 502 may include a differential pressure transducer. The frequency response of the filter structure 501 may be tuned for static pressure compensation to improve the SNR of measurements of dynamic pressure from the sensor structure 502 such as for pressure including lower-magnitude dynamic pressure superimposed on higher-magnitude static pressure. In one example, the lower-magnitude dynamic pressure may range from about one-hundredth (1/100) pounds per square inch (PSI) to about one hundred (100) PSI. In another example, the higher-magnitude static pressure may range from about one (1) PSI to about ten thousand (10,000) PSI. In another example, the higher-magnitude static pressure may be below atmospheric pressure. In another example, the lower-magnitude static pressure may be a fraction of one (1) PSI.

In FIG. 5, the filter structure 501 may be operatively coupled to the backend of the reference tube 518 exiting from the backend of the sensor structure 502. The sensor structure 502 may be configured to include a protective screen 511. Further, the pressure sensitive area of the sensor structure 502 is referenced at 513. A wire harness 515 may be used to fasten connectors such as wires carrying measurement signals from the sensor structure 502. In one example, the filter structure 501 may be securely attached to the sensor structure 502 such that the filter structure 501 may be removed or replaced. Without the use of the filter structure 501, the lower-frequency dynamic pressure may pass to, for instance, the backside of the differential transducer's diaphragm of the sensor structure 502 and may effectively cancel themselves out such that the sensor structure 502 may not measure the lower-frequency dynamic pressure or may distort the lower-frequency dynamic pressure. By using the filter structure 501, the lower frequency pressure may be fully dampened out such that only the overall static pressure within the environment reaches the sensor structure 502. Thus, the filter structure 501 may allow the sensor structure 502 to achieve static pressure compensation such that the sensor structure may provide accurate measurements of higher frequency pressure such as those with a desired frequency response of about five Hertz (5 Hz) to about twenty kilo-Hertz (20 kHz) and with an improved SNR. Therefore, the use of the filter structure 501 with the sensor structure 502 may accurately measure higher-frequency pressure in the presence of lower-frequency pressure with reduced lower frequency pressure distortion.

In the current embodiment, the filter structure 501 may be operatively coupled to the sensor structure 502 using a reference tube 518. In one example, the output of the filter structure 501 may be operatively coupled via the reference tube 518 to the backside of a differential pressure transducer associated with the sensor structure 502 such that the undesired pressure perturbations propagating through the reference tube 518 are attenuated before they reach the sensor structure 502. The reference tube 518 may also be referred to as a differential tube. In one example, the diameter of the reference tube 518 may be sufficiently small to provide additional viscous dissipation. In another example, the diameter of the reference tube 518 may range from about five thousandths of an inch (5 mils) to about fifty thousandths of an inch (50 mils). In another example, the length of the reference tube 518 may be a sufficient length to provide additional viscous dissipation. In another example, the length of the reference tube 518 may range from about one-tenth of an inch (0.1 in) to about several feet. The reference tube 518 may operatively couple the pressure at the front of the sensor structure 502 with the backside of the diaphragm of a sensor of the sensor structure 502.

In FIG. 5, in operation, the filter structure 501 may be configured to receive at the inlet port 513, at the frontend of the housing 503, an input pressure. The input pressure may include a static pressure ($P_S$), a lower-frequency dynamic pressure ($P_{LD}$) and a higher-frequency dynamic pressure ($P_{HD}$) The filter structure 501 may filter, by the porous filter 505, the input pressure to substantially remove, for instance, particulate matter. The filter structure 501 may filter, by the restricting tube 507, the input pressure to substantially pass an output pressure having the static pressure ($P_S$), the lower-frequency dynamic pressure ($P_{LD}$), and the attenuated higher-frequency dynamic pressure ($P_{HD}$). The filter structure 501 may output from the outlet port 514, from the backend of the housing 503, at the frontend of the reference tube 518, the output pressure. The sensor structure 502 may receive the input pressure. Also, the sensor structure 502 may receive, from the backend of the reference tube 518, the output pressure. The sensor structure 502 may determine a difference between the input pressure and the output pressure, wherein the difference is substantially indicative of the higher-frequency dynamic pressure ($P_{HD}$). The sensor structure 502 may output a signal substantially indicative of the higher-frequency dynamic pressure ($P_{HD}$).

In another embodiment, a filter structure may include a single tube or an array of tubes in series or parallel of varying diameters or lengths such that the desired viscosity driven dampening is achieved. In one example, the filter structure may be included as part of the body of a sensor such as a pressure transducer. In another example, the filter structure may be designed so that it may be removed or replaced. In another example, the filter structure may be adapted to the frontend of a sensor such as a pressure transducer.

In another embodiment, a sensor structure may include a miniature piezo-resistive pressure sensor such as a microphone. The output pressure from a filter structure may be input to the backside of the miniature piezo-resistive pressure sensor, thereby achieving static pressure compensation or the desired frequency response of the pressure transducer. In one example, the filter structure may be capable of passing lower-frequency pressure such as those below ten Hertz (10 Hz) to the backside of the miniature piezo-resistive pressure sensor, resulting in dampening higher-frequency dynamic pressure ($P_{HD}$) and accurately reproducing the dynamic pressure signal. As discussed previously, the filter structure may be tuned such that the desired frequency response from the sensor structure is achieved.

In another embodiment, a system or portions thereof may be used in a high-temperature environment, such as a gas turbine.

In another embodiment, a filter structure may be adapted to a high-temperature transducer.

In another embodiment, a filter structure may be adapted to a liquid-cooled transducer.

In another embodiment, a system may be configured to include a filter structure positioned in front of an absolute, sealed gauge, gauge or differential pressure transducer in order to slow the response of the transducer to pressure.

In another embodiment, a system may be used to only measure a static pressure. In such instances, the sensor structure may be damaged by unwanted dynamic pressure. Further, the measurements from the sensor structure may be negatively impacted by the dynamic pressure. To mitigate these effects, a filter may be tuned to reduce dynamic pressure via viscosity effects.

Figure 6:
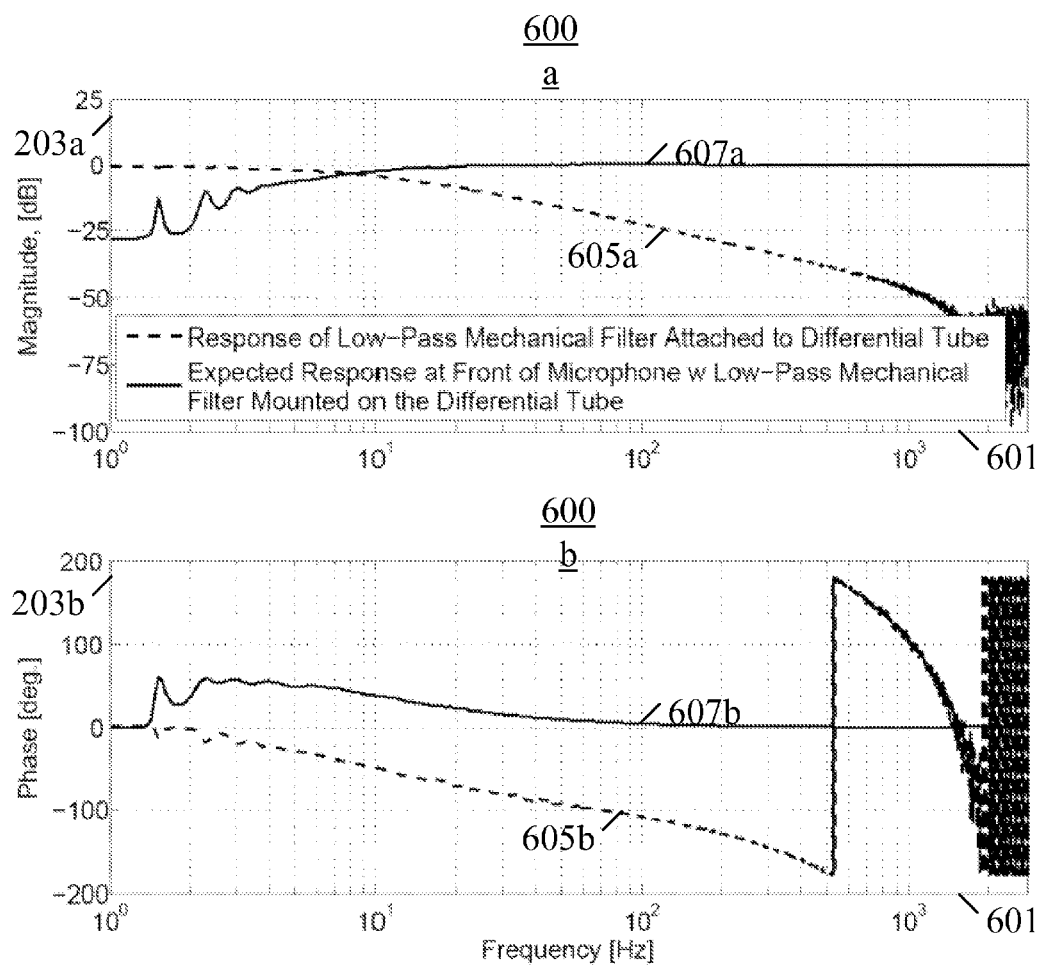
FIG. 6 illustrates a transfer function of one embodiment of the system of FIG. 5.

FIG. 6 illustrates a transfer function of one embodiment of the system 500 of FIG. 5. The transfer function is characterized by a frequency response 600a and a phase response 600b. For each response 600a and 600b, the frequency from one Hertz (1 Hz) to three thousand Hertz (3 kHz) is plotted on the abscissa 601. For the frequency response 600a, the logarithmic magnitude from negative one hundred decibels (−100 dB) to twenty-five decibels (25 dB) is plotted on the ordinate 603a. For the phase response 600b, the phase from negative two hundred degrees (−200°) to two hundred degrees (200°) is plotted on the ordinate 603b. For the frequency response 600a, a graph 605a shows the experimentally determined frequency response at the back of the sensor structure 502 with effective static pressure compensation via the low-pass mechanical filter attached to the reference tube 518. Further, a graph 607a represents the expected frequency response as measured at the front of the microphone with the low-pass mechanical filter attached to the 518 at the sensor structure 502. For these measurements, the porous filter 505 of the filter structure 501 is a porous sintered metal filter. Further, the restricting tube 507 may use an array of micro-sized tubes. Similarly, for the phase response 600b, a graph 605b shows the phase response at the back of the sensor structure 502 after the effective low-pass mechanical filter via the reference tube 518. Further, a graph 607b represents an experimentally determined phase response as expected at the front of the sensor 518 at the sensor structure 502 with an effective filter. The results show that the filter structure 501 dampens the higher-frequency dynamic pressure above a cutoff frequency of about eight Hertz (8 Hz), with minimal undesirable resonances.

It is important to recognize that it is impractical to describe every conceivable combination of components or methodologies for purposes of describing the claimed subject matter. However, a person having ordinary skill in the art will recognize that many further combinations and permutations of the subject technology are possible. Accordingly, the claimed subject matter is intended to cover all such alterations, modifications and variations that are within the spirit and scope of the claimed subject matter.

Although the present disclosure describes specific examples, embodiments, and the like, various modifications and changes may be made without departing from the scope of the present disclosure as set forth in the claims below. For example, although the example methods, devices and systems, described herein are in conjunction with a configuration for the aforementioned improved dynamic pressure measurements, the skilled artisan will readily recognize that the example methods, devices or systems may be used in other methods, devices or systems and may be configured to correspond to such other example methods, devices or systems as needed. Further, while at least one example, embodiment, or the like has been presented in the foregoing detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all of the claims. Any benefits, advantages, or solutions to problems that are described herein with regard to specific examples, embodiments, or the like are not intended to be construed as a critical, required, or essential feature or element of any or all of the claims.

What is claimed is:
1. A method, comprising:
  receiving, at a frontend of a filter structure having a restricting tube an input pressure having a static pressure ($P_S$), a lower-frequency dynamic pressure ($P_{LD}$) and a higher-frequency dynamic pressure ($P_{HD}$);
  filtering, by the restricting tube, the input pressure to substantially pass an output pressure having the static pressure ($P_S$), the lower-frequency dynamic pressure ($P_{LD}$), and an attenuated higher-frequency dynamic pressure ($P_{LD}$); and outputting, from a backend of the filter structure, the output pressure.

2. The method of claim 1, wherein the output pressure is substantially indicative of the static pressure ($P_S$) and the lower-frequency dynamic pressure ($P_{LD}$).

3. The method of claim 1, further comprising:
filtering, by a porous filter operatively coupled to the restricting tube, the input pressure to substantially remove particulate matter.

4. The method of claim 1, further comprising:
receiving, at a sensor structure operatively coupled to the filter structure, the input pressure;
receiving, at the sensor structure, from the filter structure, the output pressure;
determining, at the sensor structure, a difference between the input pressure and the output pressure, wherein the difference is substantially indicative of the higher-frequency dynamic pressure ($P_{HD}$); and
outputting, from the sensor structure, a signal substantially indicative of the higher-frequency dynamic pressure ($P_{HD}$).

5. The method of claim 4, wherein receiving the output pressure includes:
receiving, from the filter structure, by a reference tube operatively coupled between the filter structure and the sensor structure, the output pressure; and
outputting, at the sensor structure, by the reference tube, the output pressure.

6. The method of claim 1, wherein the restricting tube is a single restricting tube.

7. The method of claim 1, wherein the restricting tube is an array of restricting tubes.

8. A system, comprising:
a housing defining an elongated chamber with a frontend and a backend;
a restricting tube disposed within the chamber;
wherein the system is configured to:
receive, at the frontend of the housing, an input pressure having a static pressure ($P_S$), a lower-frequency dynamic pressure ($P_{LD}$) and a higher-frequency dynamic pressure ($P_{HD}$);
filter, by the restricting tube, the input pressure to substantially pass an output pressure having the static pressure ($P_S$), the lower-frequency dynamic pressure ($P_{LD}$), and an attenuated higher-frequency dynamic pressure ($P_{HD}$); and
outputting, at the backend of the housing, the output pressure.

9. The system of claim 8, wherein the output pressure is substantially indicative of the static pressure ($P_S$) and the lower-frequency dynamic pressure ($P_{LD}$).

10. The system of claim 8, further comprising a porous filter disposed within the chamber and operatively coupled to the restricting tube; and
wherein the system is further configured to filter, by the porous filter, the input pressure to substantially remove particulate matter.

11. The system of claim 10, wherein at least one of the porous filter and the restricting tube are removable.

12. The system of claim 8, further comprising:
a restricting tube holder disposed within the chamber to secure the restricting tube.

13. The system of claim 8, further comprising:
a cap disposed within the chamber at the frontend of the housing to allow the input pressure to enter the housing.

14. The system of claim 12, wherein the cap is removable.

15. The system of claim 12, wherein the cap screws into the chamber.

16. The system of claim 8, wherein the restricting tube is a single restricting tube.

17. The system of claim 8, wherein the restricting tube is an array of restricting tubes.

18. A system, comprising:
a reference tube including a frontend and a backend;
a filter structure operatively coupled to the frontend of the reference tube, comprising:
a housing defining an elongated chamber with a frontend and a backend;
a restricting tube disposed within the chamber;
wherein the filter structure is configured to:
receive, at the frontend of the housing, an input pressure having a static pressure ($P_S$), a lower-frequency dynamic pressure ($P_{LD}$) and a higher-frequency dynamic pressure ($P_{HD}$);
filter, by the restricting tube, the input pressure to substantially pass an output pressure having the static pressure ($P_S$), the lower-frequency dynamic pressure ($P_{LD}$), and an attenuated higher-frequency dynamic pressure ($P_{HD}$); and
outputting, from the backend of the housing, at the frontend of the reference tube, the output pressure; and
a sensor structure operatively coupled to the backend of the reference tube, wherein the sensor structure is configured to:
receive the input pressure;
receive, from the filter structure, at the backend of the reference tube, the output pressure;
determine a difference between the input pressure and the output pressure, wherein the difference is substantially indicative of the higher-frequency dynamic pressure ($P_{HD}$); and
output a signal substantially indicative of the higher-frequency dynamic pressure ($P_{HD}$).

19. The system of claim 18, further comprising a porous filter disposed within the chamber of the filter structure and operatively coupled to the restricting tube; and
wherein the filter structure is further configured to filter, by the porous filter, the input pressure to substantially remove particulate matter.

20. The system of claim 16, wherein the filter structure further includes:
a restricting tube holder disposed within the chamber to secure the restricting tube.

* * * * *